Figures 1, 2:
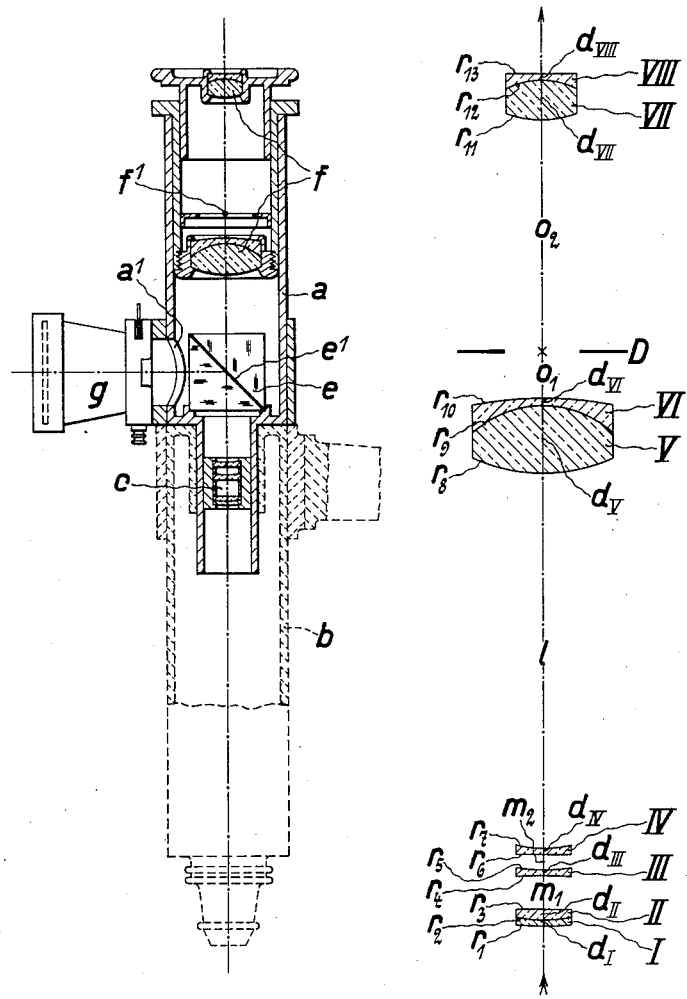

Oct. 16, 1923.  1,470,770
H. SIEDENTOPF
TUBE EXTENSION FOR MICROSCOPES
Filed Oct. 16, 1922

Inventor:
Henry Siedentopf

Patented Oct. 16, 1923.

1,470,770

UNITED STATES PATENT OFFICE.

HENRY SIEDENTOPF, OF JENA, GERMANY, ASSIGNOR TO THE FIRM OF CARL ZEISS, OF JENA, GERMANY.

TUBE EXTENSION FOR MICROSCOPES.

Application filed October 16, 1922. Serial No. 594,941.

*To all whom it may concern:*

Be it known that I, HENRY SIEDENTOPF, a citizen of Germany, and residing at Jena, Germany, have invented a new and useful Tube Extension for Microscopes (for which I have filed an application in Germany October 29th, 1921), of which the following is a specification.

The present invention relates to a photomicrographic device which instead of one of the usual oculars is capable of being inserted or screwed into a microscope tube so that, when using such a device, no special holder for the photographic camera is required in spite of the possibility of using the microscope in quick succession for observation with one of the customary oculars and for making exposures. According to the invention the novel device consists of a tube extension which is provided with a Huygenian ocular, a photographic camera and a ray-dividing surface in such a way that simultaneously part of the luminous rays entering the tube gets into the ocular and the remaining part into the photographic camera. In addition, there is disposed in the tube extension in front of the ray-dividing surface a negative lens system, the focal length of which is at the most equal to that of the ocular. This kind of structure admits of continuously observing the object to be taken also during the exposure by means of the combination well-known with microscopes, of a Huygenian ocular with a photographic camera as well as a ray-dividing surface disposed in front of the latter. Moreover, by the insertion of the above mentioned negative lens system and in spite of the possibility of observing in the ocular the whole image to be taken, even with a higher magnification than it is taken on the photographic plate, the length of the device may be kept comparatively short, so that by slipping the device on the microscope tube the stability of the microscope will not be impaired in an inadmissible way. As a photographic camera there is generally only used a box without objective, serving for keeping off false light and being provided with a dark slide holder and a shutter.

The partial magnifications of the Huygenian ocular and the negative lens system are suitably so chosen as to be almost equal to each other with a view to make both partial systems contribute as uniformly as possible to the optical performance of the complete ocular, as which the combination of the negative system with the Huygenian ocular may be assumed, whereby particularly the attainment of high ocular magnifications is facilitated.

The annexed drawing shows a device according to the invention, viz, Fig. 1 a section containing the optical axis of this device and Fig. 2 its complete lens system on an enlarged scale.

Within a tube $a$, which is to be slipped on a microscope tube $b$, there is disposed a negative lens system $c$, a separating prism system $e$ having a semi-pervious silvered layer $e^1$ and a Huygenian ocular $f$, in the image plane of which is a line mark $f^1$. In addition, laterally of the prism system $e$ there is fixed on the tube $a$, which at the place is provided with an opening $a^1$, a photographic camera $g$ in such a manner that the plane of its ground glass is conjugate to the image plane of the Huygenian ocular. In the arrangement shown, of the luminous rays entering the tube extension, the part transmitted by the silvered layer $e^1$ gets into the Huygenian ocular $f$ and the part reflected by this layer into the photographic camera $g$. Of course, the arrangement could also be made in such a way that the distribution of these partial pencils takes place in the reverse order, i. e., that the reflected part of the luminous rays gets into the Huygenian ocular and the one transmitted by the silvered layer into the photographic camera.

The subjoined tables indicate the optically important dimensions for the complete ocular, corresponding to the denotations shown in Fig. 2, and the characteristic values for the kinds of glass to be employed for the lenses. These values relate to a focal length of —30,6 mm. for the negative lens system and of +62,5 mm. for the Huygenian ocular and to a virtual object distance of 40,45 mm., taken from the vertex of the foremost lens of the complete ocular.

| Radii. | Thicknesses and distances. |
|---|---|
| $r_1 = +\ 99{,}57$ mm. | $d_I = 1$ mm. |
| $r_2 = +\ 22{,}90$ mm. | $d_{II} = 2$ mm. |
| $r_3 = -167{,}75$ mm. | $m_1 = 6{,}5$ mm. |
| $r_4 = -\ 74{,}08$ mm. | $d_{III} = 1$ mm. |
| $r_5 = +\ 36{,}71$ mm. | $m_2 = 3$ mm. |
| $r_6 = \infty$ mm. | $d_{IV} = 1$ mm. |
| $r_7 = +\ 24{,}22$ mm. | $l = 73{,}3$ mm. |
| $r_8 = +\ 35{,}087$ mm. | $d_V = 13$ mm. |
| $r_9 = -\ 20{,}87$ mm. | $d_{VI} = 1{,}3$ mm. |
| $r_{10} = -\ 74{,}72$ mm. | $o_1 = 9{,}2$ mm. |
| $r_{11} = +\ 20{,}465$ mm. | $o_2 = 45$ mm. |
| $r_{12} = -\ 15{,}61$ mm. | $d_{VII} = 7{,}5$ mm. |
| $r_{13} = \infty$ mm. | $d_{VIII} = 1{,}3$ mm. |

*Kinds of glass.*

|  | I | II | III | IV | V | VI | VII | VIII |
|---|---|---|---|---|---|---|---|---|
| $n_D$ | 1,5163 | 1,6489 | 1,6489 | 1,6489 | 1,5163 | 1,6188 | 1,5308 | 1,5900 |
| $\nu$ | 64,0 | 33,8 | 33,8 | 33,8 | 64,0 | 36,5 | 58,0 | 41,1 |

I claim:

1. In a tube extension for microscopes a Huygenian ocular, a photographic camera, a ray-dividing surface, optical means for transmitting simultaneously part of the luminous rays, entering the tube, into the ocular and the remaining part into the photographic camera, and a negative lens system disposed in front of the said ray-dividing surface, the focal length of this negative lens system being at the most equal to that of the ocular.

2. In a tube extension for microscopes a Huygenian ocular, a photographic camera, a ray-dividing surface, optical means for transmitting simultaneously part of the luminous rays, entering the tube, into the ocular and the remaining part into the photographic camera, and a negative lens system disposed in front of the said ray-dividing surface, the partial magnifications of the said Huygenian ocular and the said negative lens system being almost equal to each other.

HENRY SIEDENTOPF.